UNITED STATES PATENT OFFICE.

HENRY BLUMENBERG, JR., OF NEW YORK, N. Y.

ELECTRIC-BATTERY COMPOUND.

SPECIFICATION forming part of Letters Patent No. 637,071, dated November 14, 1899.

Application filed December 31, 1898. Serial No. 700,819. (No specimens.)

*To all whom it may concern:*

Be it known that I, HENRY BLUMENBERG, Jr., a citizen of the United States, residing at New York, (Wakefield,) in the borough of Bronx and State of New York, have invented an Improvement in Electric-Battery Compounds, of which the following is a specification.

In electric batteries it is customary to make use of sulfuric acid in connection with an oxidizing agent, and these oxidizing agents have been numerous; but in all instances the sulfuric acid has been difficult of application and has had to be used in a liquid form, and it is necessary for the party using the same to introduce the proper amount of sulfuric acid in proportion to the oxidizing agent.

Bisulfate of sodium is a very cheap material, especially as it is a by-product in the manufacture of nitric acid, and I have discovered that bisulfate of sodium or bisulfate of an alkali metal can be used as a substitute for sulfuric acid in electric batteries, and the bisulfate of sodium or potassium being in a solid form can be mixed as a dry salt along with any of the known oxidizing materials that are in the form of salts, so that the proper proportion of the chemicals employed can be secured, and the mixture is ready to be put into the battery-cell, together with water for making the electrolytic solution.

In the present improvement the alkali-metal bisulfate furnishes the sulfuric acid necessary for acting with the oxidizing agent in the battery-cell, and the use of liquid sulfuric acid is entirely avoided.

In carrying out my invention I make use of bisulfate of sodium or potassium in connection with any desired oxygen-bearing compounds—such as chromic acid, bichromate of sodium, bichromate of potassium, nitrate of sodium, or other oxygen-bearing materials—and the proportion of the bisulfate of sodium or potassium to the oxygen-bearing ingredients will be regulated according to the materials made use of, and it is advantageous to mix the bisulfate of sodium or potassium with the oxygen-bearing salts in the proper proportion and in their dry state, so that the battery solution is made by the introduction of the proper proportion or quantity of the salts into the battery-cell, together with water for forming the solution. These ingredients are very easy to handle and can be put up so as to form the battery solution of the most approved character by the simple addition of water. They may be mixed before being put up in packages or may be kept separate.

I have found that one of the most efficient battery solutions is formed by the mixture of bisulfate of sodium and bichromate of sodium with water; but I do not limit myself, but employ the bisulfate of sodium with any of the known oxygen-bearing compounds or battery ingredients.

I claim as my invention—

1. The battery compound composed of bisulfate of an alkali or alkaline earth metal and an active oxidizing agent, both in a dry condition and in the proper proportion for the battery-cell and adapted to be used with water in such cell, substantially as set forth.

2. A battery compound composed of a bisulfate of sodium and an active oxidizing agent in a dry condition, substantially as set forth.

Signed by me this 30th day of December, 1898.

HENRY BLUMENBERG, JR.

Witnesses:
GEO. T. PINCKNEY,
S. T. HAVILAND.